UNITED STATES PATENT OFFICE.

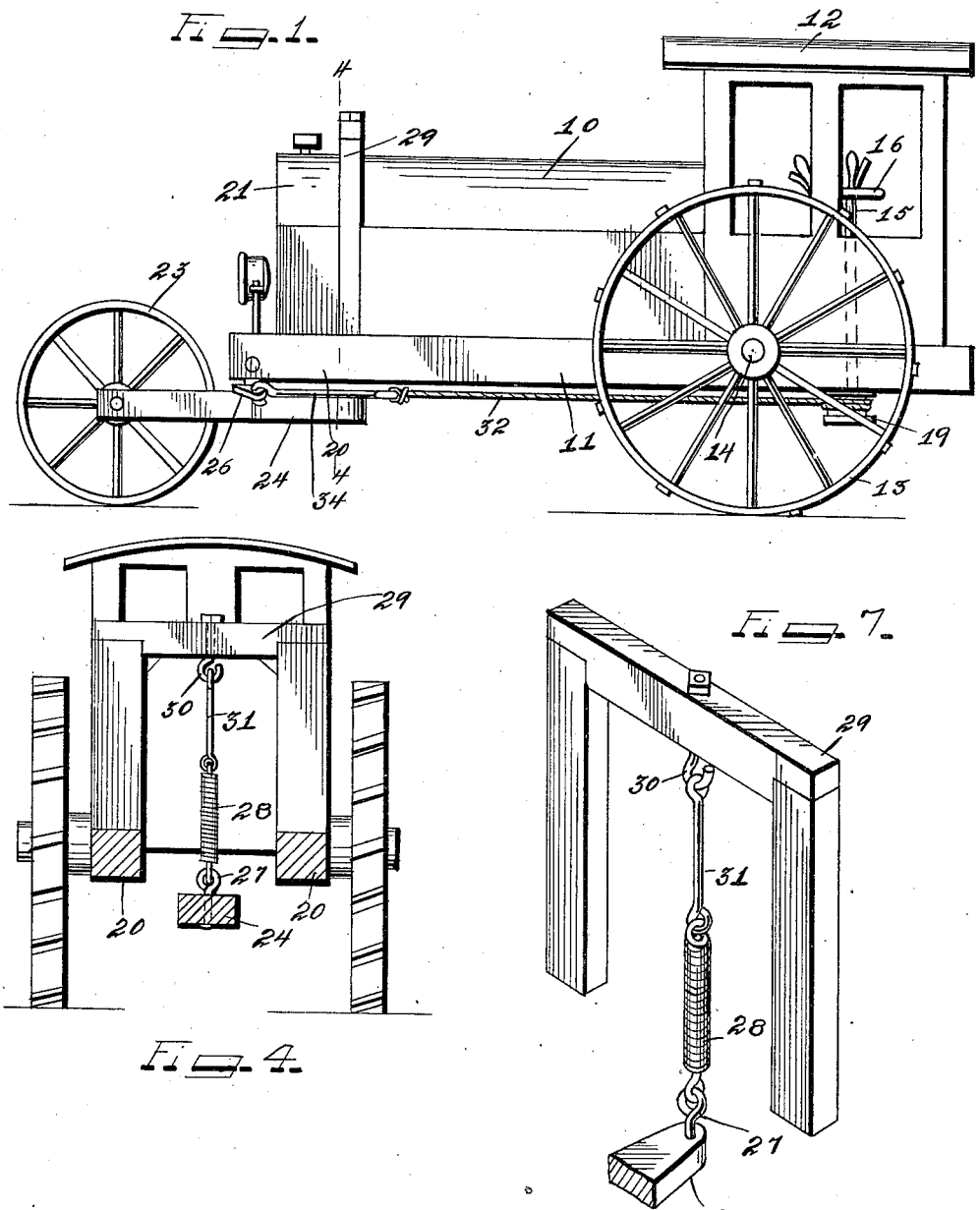

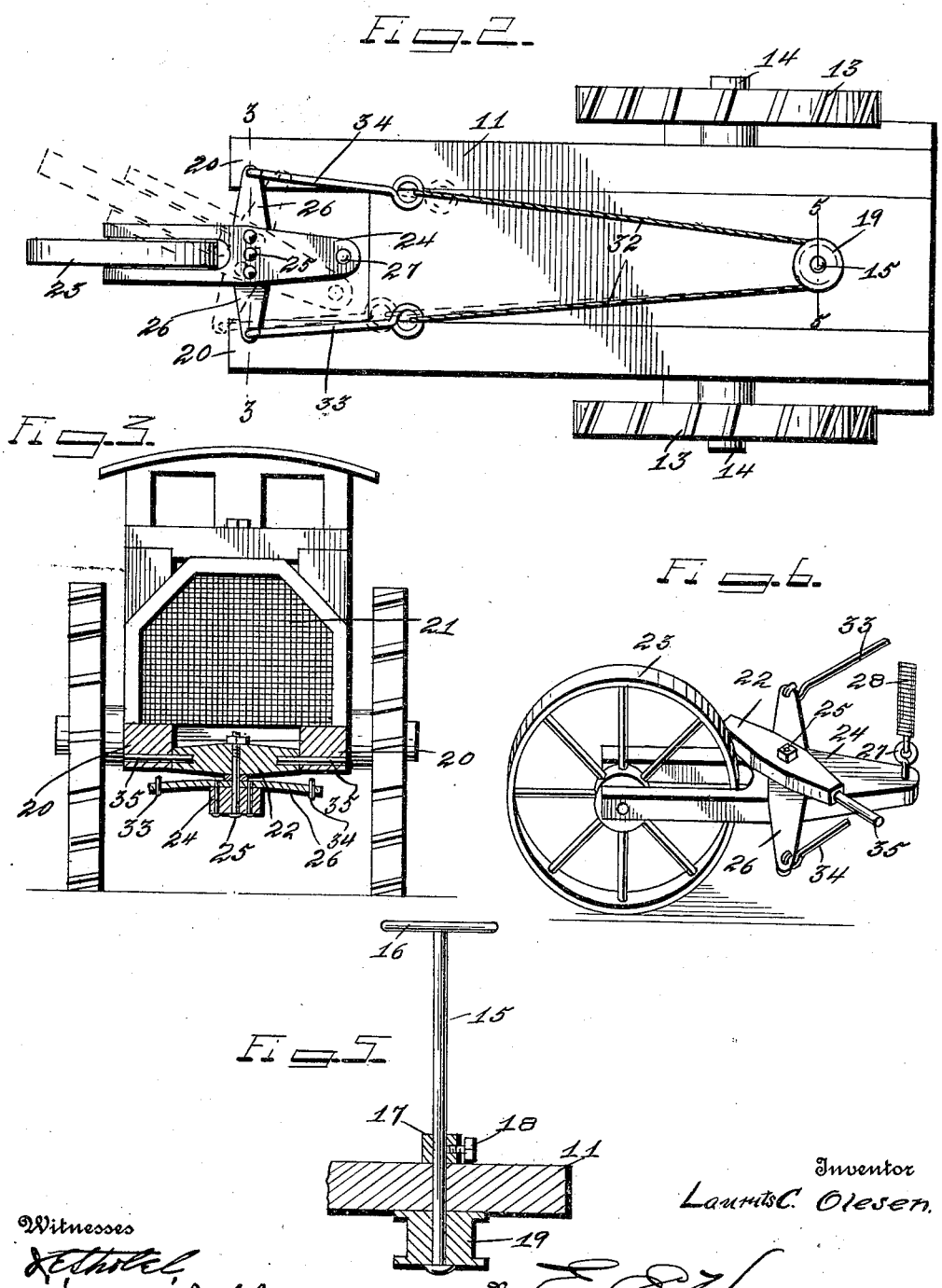

LAURITS C. OLESEN, OF EMMETSBURG, IOWA.

GASOLENE TRACTION-ENGINE.

1,090,645.  Specification of Letters Patent.  Patented Mar. 17, 1914.

Application filed August 23, 1913. Serial No. 786,327.

*To all whom it may concern:*

Be it known that I, LAURITS C. OLESEN, a citizen of the United States, residing at Emmetsburg, in the county of Palo Alto and State of Iowa, have invented certain new and useful Improvements in Gasolene Traction-Engines, of which the following is a specification, reference being had therein to the accompanying drawing.

This invention relates to a guiding means for a traction engine and the principal object of the invention is to provide the traction engine with an improved means whereby the front wheel may be readily turned from the rear portion of the engine.

Another object of the invention is to provide the supporting fork of the front wheel with a resilient supporting means for its inner end so that the front wheel may follow the unevenness of the road without the engine being jolted.

With these and other objects in view, this invention consists of certain novel combinations, constructions and arrangements of parts as will be hereinafter fully described and claimed.

This invention is illustrated in the accompanying drawings, wherein:

Figure 1 is a side elevation of a traction engine provided with an improved steering means. Fig. 2 is a bottom plan view of the engine. Fig. 3 is a vertical sectional view taken along the line 3—3 in Fig. 2. Fig. 4 is a vertical sectional view taken along the line 4—4 of Fig. 1. Fig. 5 is a sectional view taken along the line 5—5 in Fig. 2 and shows the manner of mounting the steering wheel. Fig. 6 is a perspective view of the front wheel and its supporting fork. Fig. 7 is a perspective view of the frame and resilient support for the inner end of the wheel fork.

The engine 10 may be of any type desired, but is preferred of the internal combustion type. This engine is provided with a supporting frame 11 at the rear end of which is the cab 12 in which the operator stands. The rear wheels 13 are rotatably mounted upon the axle 14 and are positioned beneath the cab so that the rear end portion of the engine will be held well above the ground. The steering shaft 15 passes through the supporting frame 11 and is provided with a hand wheel 16 and the collar 17 which is held in place by the set-screw 18 and holds the steering shaft in the desired position. This shaft extends through the bottom of the frame and has a drum 19 rigidly secured to its lower end portion so that when the shaft is turned by the steering wheel, the drum will be rotated by the shaft.

The frame is provided with a pair of arms 20 at its forward end which arms extend beneath the radiator 21 and not only form supports for the pivotally mounted bolster 22 but also form means for supporting the radiator. The forward guiding wheel 23 is pivotally mounted between the arms of the fork 24 and is pivotally connected with the bolster by the pin 25 which passes through the bolster 22 and through the center of the transversely extending cross-plate 26 carried by the fork 24. This fork 24 extends inwardly beyond the bolster 22 and is provided at its inner end with an eye 27 to which the lower end of the spring 28 is secured. A frame 29 is carried by the arms 20 behind the radiator 21 and carries a hook 30 with which the link 31 at the upper end of the spring 28 is pivotally connected. A cable 32 is wound about the drum 19 and has its ends connected with the links 33 and 34 which are connected with the ends of the cross-plate 26.

As the traction engine travels along a road, the front wheel may follow the uneven places in the road without jolting the engine since the spring 28 will permit the bolster 22 to turn upon its pivots 35 without the engine being moved. If it is desired to turn a curve in the road, the wheel 16 can be rotated and this will turn the drum 19 and move the front wheel from the position shown in full lines in Fig. 2 to that indicated by the dotted lines. A device has thus been provided by means of which the front wheel may have transverse and vertical movement without the body of the engine being moved vertically and thus jolted.

What I claim is:

A vehicle comprising a frame, arms at the forward end of said frame, a bolster pivotally mounted between said arms, a supporting frame carried by said arms, a fork pivotally connected with said bolster intermediate the length of said fork, whereby the inner end of the fork will extend to a point approximately in alinement with said supporting frame carried by said arms, resilient means yieldably connecting the inner end of said fork with said supporting frame, and means for turning said fork upon its pivot to direct the course of travel of said vehicle.

In testimony whereof I hereunto affix my signature in presence of two witnesses.

LAURITS C. OLESEN.

Witnesses:
GEORGE A. FREEMAN,
E. M. SPELTZ.